H. A. TOWNSLEY.
COMBINED LEVEL AND PLUMB.
APPLICATION FILED MAR. 6, 1917.
1,290,685.
Patented Jan. 7, 1919.
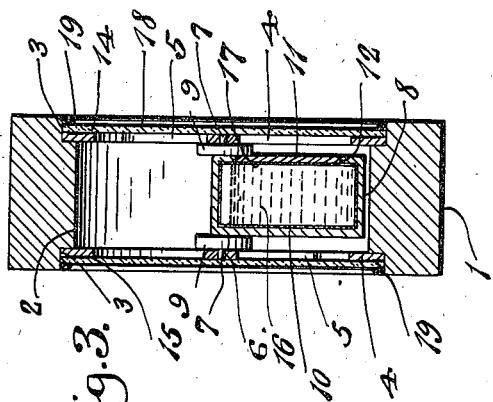
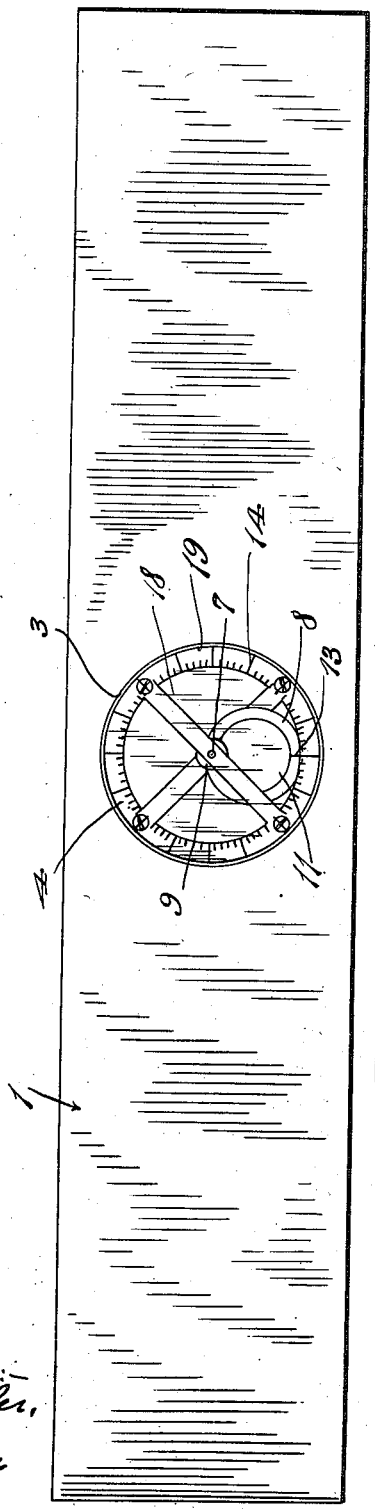
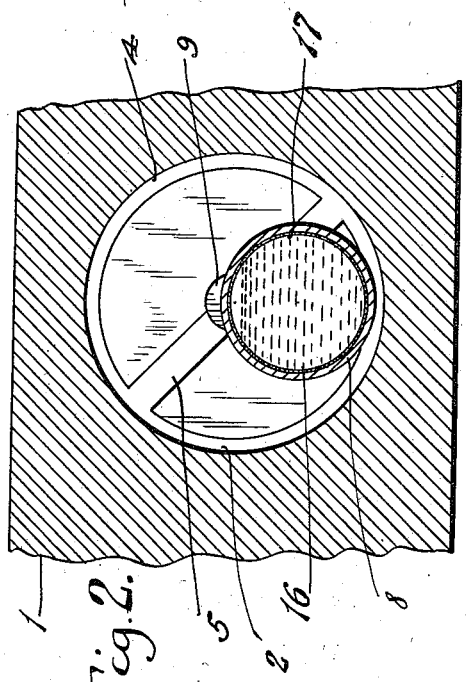
Witnesses:—
J. P. Mahler,
H. F. Riley
Inventor
H. A. Townsley.
By
Attorney

UNITED STATES PATENT OFFICE.

HARLIE A. TOWNSLEY, OF BALTIMORE, MARYLAND.

COMBINED LEVEL AND PLUMB.

1,290,685.   Specification of Letters Patent.   Patented Jan. 7, 1919.

Application filed March 6, 1917. Serial No. 152,584.

*To all whom it may concern:*

Be it known that I, HARLIE A. TOWNSLEY, a citizen of the United States, residing at Baltimore, State of Maryland, have invented certain new and useful Improvements in Combined Levels and Plumbs; and I do hereby declare the following to be a full, clear, and exact description of the invention, such as will enable others skilled in the art to which it appertains to make and use the same.

The invention relates to improvements in combined levels and plumbs.

The object of the present invention is to improve the construction of combined levels and plumbs and to provide a simple, practical and efficient combined level and plumb having a pivotally mounted indicating device equipped with means for absorbing jars and vibrations and adapted to bring the indicating device rapidly to an indicating position thereby enabling the device to be used with greater rapidity and accuracy than levels and plumbs having pivoted indicating devices not having such means.

With these and other objects in view, the invention consists in the construction and novel combination of parts hereinafter fully described, illustrated in the accompanying drawing and pointed out in the claims hereto appended; it being understood that various changes in the form, proportion, size and minor details of construction, within the scope of the claims, may be resorted to without departing from the spirit or sacrificing any of the advantages of the invention.

In the drawing:

Figure 1 is a front elevation of a combined level and plumb constructed in accordance with this invention.

Fig. 2 is a longitudinal sectional view of the central portion of the device.

Fig. 3 is a transverse sectional view of the same.

Like numerals of reference designate corresponding parts in the several figures of the drawing.

In the accompanying drawing, in which is illustrated the preferred embodiment of the invention, the combined level and plumb comprises in its construction a level body 1 designed to be constructed of wood or other suitable material and provided with a central circular opening 2 and having recesses 3 at the front and back of the opening for the reception of supporting rings 4. The supporting rings 4, which are secured by screws or other suitable fastening means to the body 1, are provided with oppositely inclined diametrically arranged bars 5 having centrally alined pivot openings 6 forming bearings for a transverse pivot 7 of an oscillatory indicating device consisting of a hollow cylinder 8 hung at the top by the pivot from the bearing openings of the inclined bars, as clearly illustrated in Fig. 3 of the drawing.

The hollow cylinder, which is spaced from the supporting bars by washers 9, is provided at one of the side faces with a wall 10 forming one of the ends or heads of the cylinder, and its other end receives a threaded plug 11 which is screwed into and engages threads 12 of the cylinder and has its outer face arranged in flush relation with the adjacent end edges of the said cylinder. The cylinder is of a diameter sufficient to extend slightly below the inner peripheries or edges of the supporting rings and it is provided at each of its ends or flat faces with an indicating mark 13 adapted to coact with marks 14 and 15 of the supporting rings of the body for enabling the device to be used either as a level or plumb in the usual manner.

In order to enable the indicating device to be brought quickly to a stop when the level or plumb is transferred from one position to another, the hollow cylinder is provided with a filling of mercury 16 and the mass of mercury is not quite sufficient to fill the hollow cylinder so that there is a limited movement of the mercury with relation to the said cylinder. The hollow cylinder is designed to be provided with an interior coating 17 of paraffin or any other suitable material to prevent the brass or other metal of which the indicating device may be constructed from absorbing the mercury and the mass of mercury contained within the indicating device is adapted to absorb jars and vibrations and bring the indicating device quickly to a stationary position. This will enable the combined level and plumb to be used with rapidity and accuracy.

The body is provided at each side with a transparent disk or plate 18 of glass or other suitable material, which is retained in place by a metallic ring 19 of brass or other suitable material secured to the body 1.

What is claimed is:

1. A device of the class described including a body having a circular opening, supporting rings mounted in the opening and provided with oppositely inclined supporting bars having central bearings, and a hollow cylinder having an eccentrically arranged pivot mounted in the said bearings, said cylinder being of a sufficient diameter to extend from the pivot to the inner peripheries of the supporting rings.

2. A device of the class described including a body having a circular opening, supporting rings mounted in the opening and provided with oppositely inclined supporting bars having central bearings, and a hollow cylinder having an eccentrically arranged pivot mounted in the said bearings, said cylinder being of a sufficient diameter to extend from the pivot to the inner peripheries of the supporting rings, and provided with a relatively heavy fluid mass adapted to bring the cylinder quickly to a stand still.

In testimony whereof I affix my signature in presence of two witnesses.

HARLIE A. TOWNSLEY.

Witnesses:
 M. I. LEWIS,
 BENNETT S. JONES.